United States Patent
Fan et al.

(10) Patent No.: US 12,017,356 B2
(45) Date of Patent: Jun. 25, 2024

(54) COLLISION HANDLING METHODS IN GRASP GENERATION

(71) Applicant: FANUC CORPORATION, Yamanashi (JP)

(72) Inventors: Yongxiang Fan, Union City, CA (US); Hsien-Chung Lin, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 283 days.

(21) Appl. No.: 17/538,380

(22) Filed: Nov. 30, 2021

(65) Prior Publication Data
US 2023/0166398 A1    Jun. 1, 2023

(51) Int. Cl.
*B25J 9/16*    (2006.01)

(52) U.S. Cl.
CPC .......... *B25J 9/1612* (2013.01); *B25J 9/1607* (2013.01); *B25J 9/163* (2013.01); *B25J 9/1653* (2013.01); *B25J 9/1666* (2013.01); *B25J 9/1669* (2013.01); *B25J 9/1697* (2013.01)

(58) Field of Classification Search
CPC ........ B25J 9/1612; B25J 9/163; B25J 9/1653; B25J 9/1666; B25J 9/1669; B25J 9/1697
See application file for complete search history.

(56) References Cited

U.S. PATENT DOCUMENTS

| | | | |
|---|---|---|---|
| 2014/0163731 A1* | 6/2014 | Shi | B25J 9/0096 700/250 |
| 2019/0389062 A1* | 12/2019 | Truebenbach | B25J 9/1669 |
| 2020/0061811 A1* | 2/2020 | Iqbal | G06N 3/08 |
| 2021/0138655 A1* | 5/2021 | Mousavian | B25J 9/161 |

OTHER PUBLICATIONS

Sinha, Anirban, Task Space-Based Planning for Robust Relative Positioning, 2020, ProQuest, 110-137 (Year: 2020).*
Qian, Yingjie, Improved Trajectory Planning Method for Space Robot-System with Collision Prediction, Oct. 23, 2019, Journal of Intelligent & Robotic Systems, 290-301 (Year: 2019).*

(Continued)

*Primary Examiner* — Khoi H Tran
*Assistant Examiner* — Dairon Estevez
(74) *Attorney, Agent, or Firm* — John A. Miller; Shumaker, Loop & Kendrick LLP (57) ABSTRACT

A robotic grasp generation technique for part picking applications. Part and gripper geometry are provided as inputs, typically from CAD files. Gripper kinematics are also defined as an input. A set of candidate grasps is provided using any known preliminary grasp generation tool. A point model of the part and a model of the gripper contact surfaces with a clearance margin are used in an optimization computation applied to each of the candidate grasps, resulting in an adjusted grasp database. The adjusted grasps optimize grasp quality using a virtual gripper surface, which positions the actual gripper surface a small distance away from the part. A signed distance field calculation is then performed on each of the adjusted grasps, and those with any collision between the gripper and the part are discarded. The resulting grasp database includes high quality collision-free grasps for use in a robotic part pick-and-place operation.

20 Claims, 5 Drawing Sheets

(56) References Cited

OTHER PUBLICATIONS

Mitash, Chaitanya, Scalable, Physics Aware 6D Pose Estimation for Robot Manipulation, Oct. 2020, Rutgers, The State University of New Jersey, 84-143 (Year: 2020).*

Ten Pas, Andreas, Grasp Pose Detection in Point Clouds, 2017, ijrr, 1455-1473 (Year: 2017).*

Jia Pan, Sachin Chitta, and Dinesh Manocha. "FCL: A General Purpose Library for Collision and Proximity Queries." 2012 IEEE International Conference on Robotics and Automation. IEEE, 2012.

Stanley Osher and Ronald Fedkiw. Level Set Methods and Dynamic Implicit Surfaces. vol. 153. Springer Science & Business Media, 2006.

* cited by examiner

FIG. 5

COLLISION HANDLING METHODS IN GRASP GENERATION

BACKGROUND

Field

The present disclosure relates generally to a method for generating quality grasp data for robot grasping of parts and, more particularly, to a method for robot grasp generation which starts with a set of grasp candidates for a particular part and gripper, optimizes each grasp candidate using a virtual gripper surface which provides allowance for minor grasp adjustments, then analyzes the adjusted grasps using a signed distance field calculation to filter out any collisions.

Discussion of the Related Art

The use of industrial robots to perform a wide range of manufacturing, assembly and material movement operations is well known. One such application is a pick-and-place operation, where a robot picks up individual parts and places each part at a prescribed location for further processing or packaging. Examples of pick-and-place operations include picking a part from a bin and placing the part on a conveyor where it is taken for a next operation, and picking a part from a bin and placing the part in a machine tool fixture where the part is machined, and then subsequently removing the part from the machine tool and placing the machined part on a conveyor.

In applications such as described above, a vision system (one or more cameras) is typically used to identify the position and orientation of individual parts in the bin. Then a specific robotic grasp is identified to be used on a selected part, where the grasp may be chosen from a pre-computed database of grasps which have been generated for the particular part geometry and the particular gripper geometry.

In all robotic grasping operations, a database of quality grasps is needed. Grasp generation techniques are known which can automatically generate many grasp candidates. However, these existing techniques have downsides such as being extremely computationally expensive and slow, or making simplifications which result in computed grasps of low grasp quality. In addition, some existing grasp generation techniques rule out grasp candidates which are predicted to have a miniscule collision between the gripper and the part, when in fact many such grasps would work perfectly well in the real world as the part would move slightly during grasping to result in a high quality grasp.

In light of the circumstances described above, there is a need for a robot grasp generation technique which computes high quality grasp candidates without manual teaching, is computationally efficient, and does not unnecessarily rule out grasps based on a predicted collision which would easily be compensated for by a real world gripper and part.

SUMMARY

In accordance with the teachings of the present disclosure, a robotic grasp generation technique is presented. Part and gripper geometry are provided as inputs, typically from CAD files. Gripper kinematics are also defined as an input. A set of candidate grasps is provided using any known preliminary grasp generation tool. A point model of the part and a model of the gripper contact surfaces with a clearance margin are used in an optimization computation applied to each of the candidate grasps, resulting in an adjusted grasp database. The adjusted grasps optimize grasp quality using a virtual gripper surface, which positions the actual gripper surface a small distance away from the part. A signed distance field calculation is then performed on each of the adjusted grasps, and those with any collision between the gripper and the part are discarded. The resulting grasp database includes high quality collision-free grasps for use in a robotic part pick-and-place operation.

Additional features of the presently disclosed methods will become apparent from the following description and appended claims, taken in conjunction with the accompanying drawings.

DETAILED DESCRIPTION OF THE EMBODIMENTS

The following discussion of the embodiments of the disclosure directed to collision handling methods in robotic grasp generation is merely exemplary in nature, and is in no way intended to limit the disclosed techniques or their applications or uses.

The use of industrial robots for picking parts from a source and placing them at a destination is well known. In a typical pick-and-place operation, a supply of parts is provided in a bin, such as a bin containing a random pile of parts which have just been cast, molded or partially assembled, where the parts need to be picked up from their random poses in the bin and placed in a particular pose at a destination location.

Figure 1:
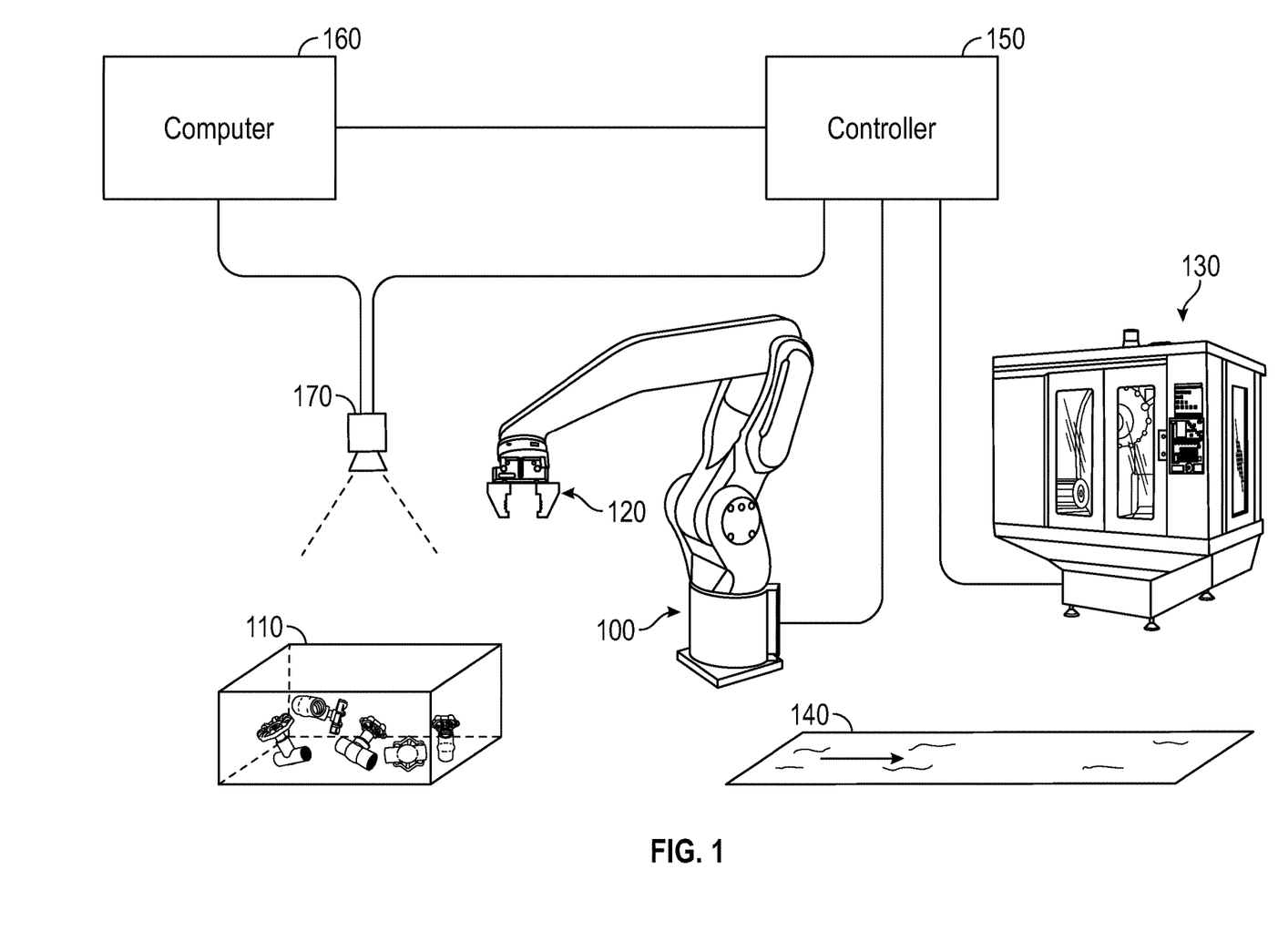
FIG. 1 is an illustration of a robotic pick-and-place system, where an industrial robot picks a part from a bin and places the part either on a conveyor or in a machining station for further processing.

FIG. 1 is an illustration of a robotic pick-and-place system, where an industrial robot 100 picks up a part from a bin 110, using a gripper 120, and places the part either in a machining station 130 or on a conveyor 140 for further processing or packaging. The gripper 120 which may be designed with a finger shape which is selected based on the shape of the parts which are being handled by the robot 100. The gripper finger shape is discussed further below.

Motion of the robot 100 is controlled by a controller 150, which typically communicates with the robot 100 via a cable. The controller 150 provides joint motion commands to the robot 100 and receives joint position data from encoders in the joints of the robot 100, as known in the art.

The controller 150 also provides commands to control operation of the gripper 120 (grip/ungrip commands and width).

A computer 160 is in communication with the controller 150. The computer 160 includes a processor and memory/storage, and runs an algorithm configured to compute a high quality grasp for a part in the bin 110 based on images and data from at least one camera 170. The camera 170 is typically a three dimensional (3D) camera providing both color image data and pixel depth map data, but may be some other type of 3D sensor which provides data suitable for determining the pose (position and orientation) of parts in the bin 110. The camera 170 could also be a multi-camera system, including two or more 2D or 3D cameras.

In some applications, the bin 110 may contain only one part, which could be in any position and orientation. This would be the case if the parts are processed by the machining station 130 at the same rate that they arrive in the bin 110. Alternately, the bin 110 may contain several parts (as shown in FIG. 1), or a substantial pile of parts. In any case, a best quality grasp candidate is determined by matching the image data from the camera 170 to a database of precomputed stable grasps.

The computer 160 provides the target grasp data to the controller 150, which controls the robot 100 and the gripper 120 to grasp a part from the bin 110. The target grasp data includes the grasp target point (x/y/z coordinates), the approach angle to be followed by the gripper 120, and the gripper angle of rotation and width. Using the grasp data, the controller 150 can compute robot motion instructions which cause the gripper 120 to grasp a part and place the part into the machining station 130 or on the conveyor 140. Alternately, the camera(s) 170 may provide images to the controller 150 which would compute the part grasp directly. In any case, grasp generation (providing a database of many different stable grasps) is performed in advance. The grasp database generation is the subject of the present disclosure, and is discussed in detail below.

Teaching a robot to recognize and grasp an individual part in a bin full of parts, in real time, has always been challenging. In order to improve the speed and reliability of robotic part picking operations, it is known to pre-compute grasps for a specified gripper grasping a particular part in a variety of poses. This pre-computing of grasps is known as grasp generation, and the pre-computed (generated) grasps are then used to make decisions in real time during robotic part picking operations, as discussed above with reference to FIG. 1.

Historically, grasp generation methods included manually teaching picking points on known 3D features of objects. These methods require significant time spent on heuristics design in order to identify the best grasp poses, and these manually designed heuristics may not provide a suitable number of high-quality grasps. Because of the difficulties of using heuristics grasp teaching, automated grasp generation methods have been developed.

However, existing automated grasp generation methods also have downsides. One known learning-based technique uses a mathematically rigorous grasp quality to search for grasp candidates before feeding these candidates to a convolutional neural network (CNN) classifier, but is computationally expensive, and the solution may not be optimal in real world situations due to simplifications used in the calculations. Another grasp generation method uses empirical trials to collect data producing realistic grasps, but this method may require tens of thousands of robot hours with complicated force controls, and any change of the gripper requires a repeat of the whole process. Still other computer-based grasp generation methods rule out many grasps due to a "collision" which are in fact just the normal part-gripper contact at the gripper finger contact surfaces. In general, existing automated grasp generation methods still do not provide a suitable number of high-quality grasps which perform well in real world conditions.

The present disclosure describes a grasp generation technique which can be automatically applied to any combination of gripper and part designs, and efficiently produces a large number of realistic, high quality grasps. The disclosed grasp generation method uses an optimization computation with a virtual gripper surface which adjusts candidate grasps to compensate for minor contact during gripping, followed by a signed distance field collision check of the adjusted grasps. The resulting grasp database includes grasps which would be unnecessarily eliminated by prior art techniques, while the grasp database does not include grasps with actual interference or collision conditions. The advance generation of the database of quality grasps enables the computer 160 or the controller 150 to perform the real-time grasp computations quickly and efficiently during actual robotic pick-and-place operations.

Figure 2:
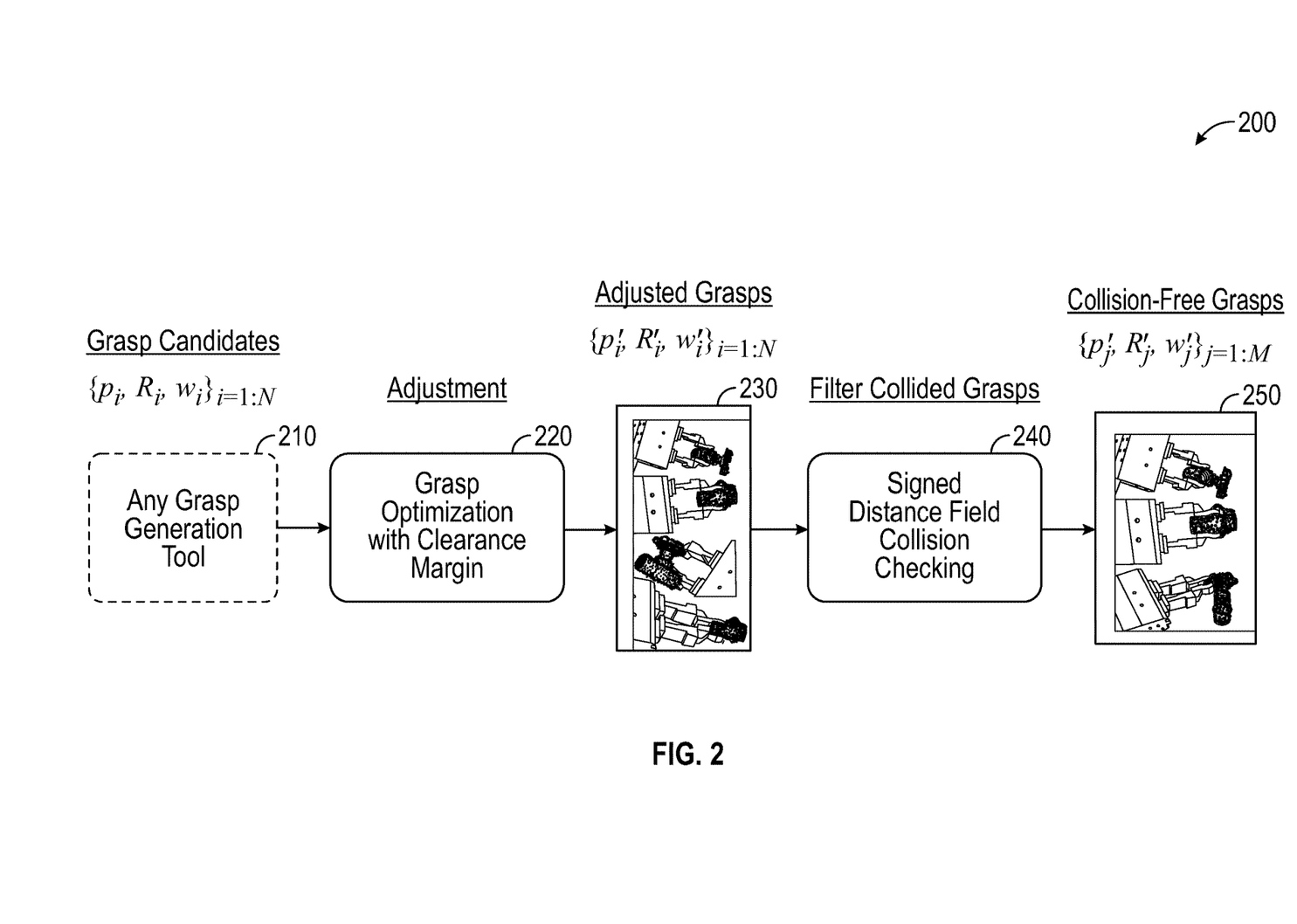
FIG. 2 is an illustrated flowchart diagram of steps included in a grasp generation process used to create a collision-free grasp database which is used in the robotic pick-and-place system of FIG. 1, according to an embodiment of the present disclosure.

FIG. 2 is an illustrated flowchart diagram 200 of steps included in a grasp generation process used to create a collision-free grasp database which is used in the robotic pick-and-place system of FIG. 1, according to an embodiment of the present disclosure.

First, a particular part and gripper are selected. The gripper model illustrated in FIG. 2 and later figures is a two-finger parallel gripper, however, other types of grippers may be used, including grippers which open their fingers to grasp an object. The gripper fingers include finger tips having a concave shape which is selected to correspond with the part (the water pipe valve) which is being grasped by the robot. That is, the finger tips can produce a stable grasp on many different parts of the water valve—such as the handle, the coupling body, the valve stem throat, etc. Grippers having different designs of the finger tips may be employed based on the shape of the part being grasped.

At box 210, for a given part (workpiece) and gripper design, a large number of grasp candidates are provided using any preliminary grasp generation tool. The preliminary grasp generation tool may be a sampling-based tool, or a learning-based tool, for example. Each grasp in the set of grasp candidates defines a pose of the gripper ($T_{gripper}$) in the coordinate frame of the part/workpiece. In a preferred embodiment, each grasp i includes a position vector $p_i$, a rotation vector $R_i$, and a gripper width value $w_i$.

The grasps in the set of grasp candidates include many different positions and orientations of the gripper on the part. For example, the gripper shown in the figures and discussed in the present application is a parallel-finger gripper with a housing body including an actuator and two gripper fingers which open and close directly opposite each other, resulting in the gripper width value $w_i$. The part shown in the figures and discussed in the present application is a water valve having a body, opposing cylindrical openings from the body, and a handle coupled to the body via a neck and shaft. The grasps in the set of grasp candidates preferably include the gripper fingers grasping the edge of the handle from many different angles, grasping the body in many different orientations, grasping each cylindrical end, grasping the neck of the valve, etc. The number of candidate grasps is identified as N.

The grasps in the set of grasp candidates are typically not analyzed for grasp quality or collision checking—the candidate grasps are simply theoretical poses of the gripper relative to the part. If the set of grasp candidate were used directly by the robot controller during robot operations, some of the attempted grasps would fail due to poor grasp quality or part-gripper interference. Thus, additional steps are needed to improve the grasps and eliminate collisions, as shown on the remainder of FIG. 2.

At box 220, a grasp optimization technique is employed which uses a "clearance margin" or virtual gripper surface to realistically simulate real-world gripping while avoiding part-gripper contact which could be construed as an interference. The grasp optimization technique adjusts each grasp using the virtual gripper surface model, causing each grasp to be optimized for grasp quality while leaving the part-gripper clearance margin which would be easily accommodated by gripper closure and possibly a slight part centering movement in real world gripping. The grasp optimization technique of the box 220 results in an adjusted grasp database 230 which includes adjusted grasps $\{p'_i, R'_i, w'_i\}_{i=1,N}$. That is, the adjusted grasp database 230 includes the same number of grasps (N) as the set of grasp candidates, where each grasp in the database 230 is adjusted slightly as discussed above.

At box 240, a signed distance field collision check is performed on each grasp in the adjusted grasp database 230. The signed distance field collision check quickly identifies any collision in the adjusted grasps in the database 230. As mentioned above, the grasp optimization at the box 220 adjusts grasps to optimize the contact of the gripper contact surfaces with the part, and the virtual gripper surface used in the optimization computation causes the resulting grasp to include a small gap between the gripper and the part. However, some of the adjusted grasps in the database 230 may still include collisions or interferences away from the gripper contact surfaces which preclude those grasps from being used in actual robotic part grasping operations. The signed distance field collision check eliminates those grasps with interferences, resulting in a collision-free grasps database 250. The collision-free grasp database 250 includes grasps $\{p'_j, R'_j, w'_j\}_{j=1,M}$. That is, the collision-free grasp database 250 includes a subset (M) of the grasps from the adjusted grasp database 230.

The grasp optimization technique of the box 220 and the signed distance field collision check of the box 240 are discussed in detail below, in connection with FIGS. 3 and 5, respectively.

Figure 3:
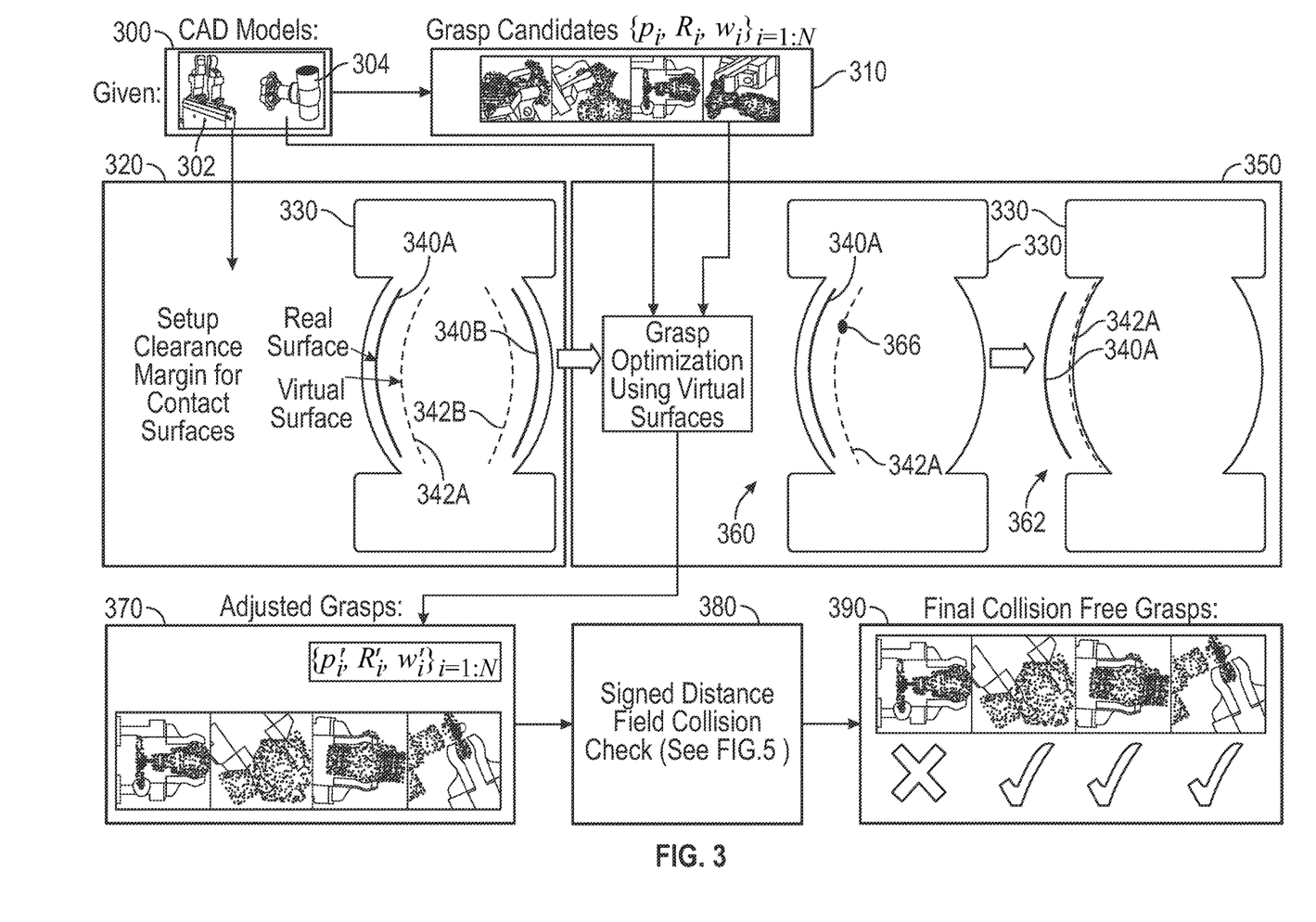
FIG. 3 is an illustration of the details of some of the steps in the grasp generation process of FIG. 2, including a grasp adjustment optimization step using virtual gripper surfaces to achieve a desired gripper positioning relative to a part, according to an embodiment of the present disclosure.

FIG. 3 is an illustration of the details of some of the steps in the grasp generation process of FIG. 2, including a grasp adjustment optimization step using virtual gripper surfaces to achieve a desired gripper positioning relative to a part, according to an embodiment of the present disclosure. At box 300, CAD models of a gripper 302 and a part (workpiece) 304 are provided. The CAD models are typically solid models, but may be surface models containing complete 3D surface geometry, as would be understood by one skilled in the art. Mechanization kinematics of the gripper 302 are also provided at the box 300; in the case of the parallel-finger gripper, this includes defining the positions/geometry of the finger elements of the gripper 302 in terms of the gripper width w.

At box 310, grasp candidates $\{p_i, R_i, w_i\}_{i=1,N}$ are provided. This is the set of grasp candidates provided at the box 210 of FIG. 2 discussed above. The set of grasp candidates typically includes many hundreds, or thousands, of candidate grasps. Each candidate grasp i (i=1, N) includes a position vector $p_i$ (three positions; x, y, z) and a rotation vector $R_i$ (three rotations, such as yaw, pitch, roll) of the gripper 302 with respect to the part 304, along with a gripper width $w_i$. In the box 310, the part 304 is illustrated in each grasp as a point cloud. The point cloud representation of the part 304 can readily be created from the CAD solid model, as understood by those skilled in the art.

At box 320, a "clearance margin" is created for contact surfaces of the gripper 302. The purpose of the clearance margin is to adjust each grasp so that the gripper is opened slightly wider than necessary for actual contact with the part surface. This is done so that the resulting grasp will not be identified as having a part-gripper interference (and therefore discarded) in a later step. The clearance margin is achieved by defining virtual gripper surfaces which are "padded" by a small thickness such as 1-2 mm relative to the actual gripper contact surfaces, as described in the following discussion.

In the box 320, a 2D cross-sectional illustration of a part 330 and gripper fingers 340A/340B are shown. The part 330 and the gripper finger contact surfaces 340A/340B represent the part and gripper in the box 300. Simplified 2D cross-sectional geometry is used in the box 320 and later in this FIG. 3 for clarity of illustration. The gripper finger contact surfaces 340A/340B are the contact surfaces of the two opposing fingers of the parallel-finger gripper of the box 300. In addition to the gripper finger contact surfaces 340A/340B (which are the actual gripper finger contact surfaces), gripper virtual contact surfaces 342A/342B are shown. The gripper virtual contact surfaces 342A/342B are defined using the clearance margin, which may have a value of 1-2 mm from the gripper finger contact surfaces 340A/340B for example, as discussed above. The clearance margin is in the direction that the gripper fingers move when grasping an object. The gripper virtual contact surfaces 342A/342B may also be defined as being slightly longer than the gripper finger contact surfaces 340A/340B, to create a clearance margin in a lateral direction across the gripper finger (not only the opening/closing direction).

At box 350, a grasp optimization computation is performed using the gripper virtual contact surfaces 342A/342B. The result of the optimization computation on each grasp is an adjusted grasp which has optimized grasp quality while providing a small clearance margin between the gripper and the part, so that the grasp does not get erroneously eliminated as having a collision in the later signed distance field calculation.

At illustration 360, the cross-section of the part 330 is shown, along with the gripper finger contact surface 340A and the gripper virtual contact surface 342A. The actual and virtual contact surfaces for only one of the gripper fingers (left side) is shown in the illustration 360 for simplicity; the same concept applies to the opposing gripper finger. The gripper finger contact surface 340A and the gripper virtual contact surface 342A are shown in their "initial" position or configuration in the illustration 360. That is, the gripper finger contact surface 340A is in the grasp position relative to the part 330 as defined by the candidate grasp from the box 310 which is to be optimized.

The initial configuration could be any one of the examples shown in the box 310, or any of the many hundreds of other candidate grasps. Beginning in the initial configuration shown in the illustration 360, an optimization computation is performed to adjust the grasp of the gripper on the part 330. The optimization computation (discussed below) results in an adjusted grasp.

The optimization computation uses the gripper virtual contact surfaces 342A/342B to represent the gripper, which both optimizes grasp quality and "pushes" the gripper finger contact surfaces 340A/340B away from the part 330. The clearance margin of the gripper virtual contact surfaces 342A/342B ensures that there is no penetration or contact between the gripper finger contact surface surfaces 340A/340B and the part 330, so that the adjusted grasp is not flagged with a false positive part-gripper interference in a later step.

Following is a discussion of one example of the grasp optimization computation that may be used at the box 350. Other grasp optimization formulations capable of computing a stable grasp between gripper contact surfaces and a part may be used, as would be understood by those skilled in the art. The grasp optimization computation begins with one of the candidate grasps, which is a pose of the gripper ($T_{gripper}$) in the coordinate frame of the part/workpiece 330, including the position p and orientation R of the gripper finger contact surfaces 340A/340B with respect to the part 330, along with a gripper width w. The optimization computation uses the gripper virtual contact surfaces 342A/342B instead of the gripper finger contact surfaces 340A/340B. As shown at the illustration 360 in the box 350, the gripper virtual contact surfaces 342A/342B will initially penetrate (interfere with) the part 330.

A set of points $pt_i$ is defined on the surfaces of the gripper virtual contact surfaces 342A/342B, using any suitable sampling density. One of the sampling points $pt_i$ on the gripper virtual contact surface 342A is shown at 366 in the illustration 360. Sampling points are also defined on the surface of the part 330. FIG. 3 is illustrated as a 2D cross-section for clarity. However, in the actual optimization computation, the surfaces of the gripper virtual contact surfaces 342A/342B and the part 330 are all three dimensional, as are the coordinates of the sampling points $pt_i$.

For each of the points $pt_i$ on the gripper virtual contact surfaces 342A/342B, a nearest neighbor point on the surface of the part 330 is determined. The nearest neighbor point is determined by computing the shortest 3D distance from the point $pt_i$ to a sampling point on the surface of the part 330, in a manner known in the art. From the points $pt_i$ on the gripper virtual contact surfaces 342A/342B and the corresponding nearest neighbor points, an optimization loop is used to update the gripper translation, rotation and opening width so that the grasp quality is improved and interference is reduced. Because the gripper virtual contact surfaces 342A/342B will initially penetrate (interfere with) the part 330, the first iteration of the optimization computation will result in a constraint penalty which "pushes" the gripper virtual contact surfaces 342A/342B away from the part 330, particularly by opening the gripper width w.

To compute stable grasps, surface contacts (using the points $pt_i$ and their nearest neighbors) and rigorous mathematic quality are adopted in the optimization modeling. Gripper-part collision is penalized in the optimization to avoid penetration, as mentioned above. Throughout the discussion of the optimization computation, the gripper virtual contact surfaces 342A/342B as defined by the points $pt_i$ are referred to as $S^f$, while the part (or "object") surface (all sampling points, and the nearest neighbor points specifically) is referred to as $S^o$.

Each iteration of the optimization computation results in a movement of the gripper virtual contact surfaces 342A/342B defined in terms of a transformation $\mathcal{T}$ including a translational transformation $\Delta p$, a rotational transformation $\Delta R$, and a gripper width transformation $\Delta w$. For example, the first iteration causes the gripper virtual contact surfaces 342A/342B to move from the initial configuration shown at 360 to a subsequent intermediate configuration (not shown), where nearest neighbor points on the part 330 are again determined, and another optimization iteration is performed.

The optimization formulation is provided below as Equations (1a)-(1d), and is discussed in the following paragraphs.

$$\max_{\Delta p, \Delta R, \Delta w, S^f, S^o} Q_g(S^f, S^o) \quad (1a)$$

$$\text{s.t.} \quad S^f \subset \mathcal{T}(\partial \mathcal{F}; \Delta p, \Delta R, \Delta w) \quad (1b)$$

$$dist(\mathcal{T}(\partial \mathcal{F}; \Delta p, \Delta R, \Delta w), O) \geq 0 \quad (1c)$$

$$(\Delta p, \Delta R, \Delta w) \in \mathcal{X} \quad (1d)$$

The optimization formulation includes an objective function (Eq. 1a) which is defined to maximize grasp quality $Q_g$, where the grasp quality $Q_g$ is a function of the contact surfaces $S^f$ and $S^o$. The grasp quality $Q_g$ may be defined in any suitable manner. In a representative embodiment, the grasp quality $Q_g$ is the negative of the total distance between the points $pt_i$ on the gripper virtual contact surface $S^f$ and the matched nearest neighbor points NN on the object surface $S^o$. In practical terms, a good quality grasp is stable, where any minor movement of the part 330 in the gripper is quickly stopped by friction and/or normal forces and does not lead to a loss of grip.

The optimization formulation includes a constraint function (Eq. 1b) which defines the gripper virtual contact surface $S^f$ in terms of the transformations ($\Delta p$, $\Delta R$, $\Delta w$). A constraint function (Eq. 1c) dictates that the transformed virtual contact surface ($\mathcal{T}(\sigma \mathcal{F}; \Delta p, \Delta R, \Delta w)$) should not penetrate the object O; that is, the distance should be greater than or equal to zero. This constraint causes the "pushing" of the gripper virtual contact surfaces 342A/342B away from the part 330 as described above. Finally, Equation (1d) indicates that the transformations $\mathcal{T}(\Delta p, \Delta R, \Delta w)$ are elements of the feasible set $\mathcal{X}$ of transformations (in one embodiment, $\Delta p$ and $\Delta R$ may have any value within predefined ranges, and $\Delta w$ is limited by the grasp range defined in the gripper model from the box 300).

The constraint functions of Equations (1b)-(1c) described above are considered by penalty methods, where the constraint violations are treated as a cost function in the grasp quality calculation. That is, the greater the constraint violations, the larger the cost function, and the smaller the grasp quality. By placing constraints into costs against grasp quality, the optimization formulation can be solved by least squares.

A one-step least square linear algebra computation is performed on the optimization formulation of Equations (1a)-(1d) to identify the transformations $\mathcal{T}(\Delta p, \Delta R, \Delta w)$ which move the gripper fingers in a direction of improved grasp quality while reducing/eliminating penetration of the gripper virtual contact surfaces 342A/342B with the part 330. This process is repeated until the grasp position converges to a local maximum grasp quality which has minimized or eliminated penetration of the gripper virtual contact surfaces 342A/342B with the part 330.

At illustration 362, the cross-section of the part 330 is shown, along with the gripper finger contact surface 340A and the gripper virtual contact surface 342A, where the gripper finger contact surface 340A and the gripper virtual contact surface 342A are shown in their "adjusted" position after optimization convergence in the illustration 362. That is, the gripper finger contact surface 340A is in the grasp position relative to the part 330 after the optimization computation which both optimizes grasp quality and "pushes" the gripper finger contact surface 340A away from the part 330. The clearance margin of the gripper virtual contact surface 342A ensures that there is no penetration or point-to-point contact between the gripper finger contact surface 340A and the part 330, so that the adjusted grasp may be determined to be collision-free (at least in the area of the gripper contact surfaces) in a later step.

After convergence to a quality adjusted grasp for one of the candidate grasps, the process is started over again with a new initial configuration (i.e., a different one of the candidate grasps). This grasp optimization computation is performed for each of the candidate grasps from the box 310, resulting in a set of adjusted grasps in box 370. The set of adjusted grasps in box 370, as discussed earlier with respect to FIG. 2, is represented as $\{p'_i, R'_i, w'_i\}_{i=1,N}$—where the "prime" (') indicates that each grasp i has been adjusted, and it is noted that the number of adjusted grasps N is the same as the number of candidate grasps. That is, no grasps are eliminated in the optimization process of the box 350.

At box 380, a signed distance field collision check is performed on each of the N adjusted grasps in the box 370. The signed distance field collision check determines whether there is any collision between the part and the gripper after the grasps have been adjusted. The signed distance field collision check checks for collisions between the entire part 330 and any part of the gripper—not just the gripper finger contact surfaces. Each adjusted grasp is evaluated using the signed distance field calculation; collision-free grasps (designated with ✓ in box 390) are retained, and grasps with any part-gripper collision (designated with x) are discarded.

In the box 390, the one adjusted grasp which is discarded (designated with x) has an interference away from the gripper finger surfaces. Specifically, the valve handle interferes with part of one gripper finger in a location near the gripper actuator body. This interference is not considered in the optimization computation of the box 350 because that optimization considers only the gripper finger contact surfaces. The signed distance field collision check is used at the box 380 for exactly this reason: so that the optimization computation can optimize grasp quality while providing a small clearance margin between the gripper finger contact surfaces and the part, and the signed distance field calculation can subsequently detect any interference which is caused by the overall grasp pose.

A final set of collision-free grasps is provided at the box 390. The details of the signed distance field collision check of the box 380 are discussed later with reference to FIG. 5. The final set of collision-free grasps in the box 390, as discussed earlier with respect to FIG. 2, is represented as $\{p'_j, R'_j, w'_j\}_{j=1,M}$—where it is noted that the number of collision-free grasps M is smaller than the number of adjusted grasps N, because some grasps have been discarded as indicated in the box 390 of FIG. 3.

Advantages of the grasp generation method shown in FIG. 3 are as follows:

The optimization computation of the box 350 considers only the gripper finger contact surfaces; this allows the optimization computation to calculate the adjusted grasps much faster than if the entirety of the gripper fingers and body were considered as in prior art methods The optimization computation uses the gripper virtual contact surfaces 342A/342B, which results in adjusted grasps with a small clearance margin between the actual gripper finger contact surfaces 340A/340B and the part 330

The signed distance field collision check of the box 380 (details discussed below) is a very efficient computation which identifies and discards any adjusted grasps with an interference between the gripper (in its entirety) and the part 330

Figure 4:
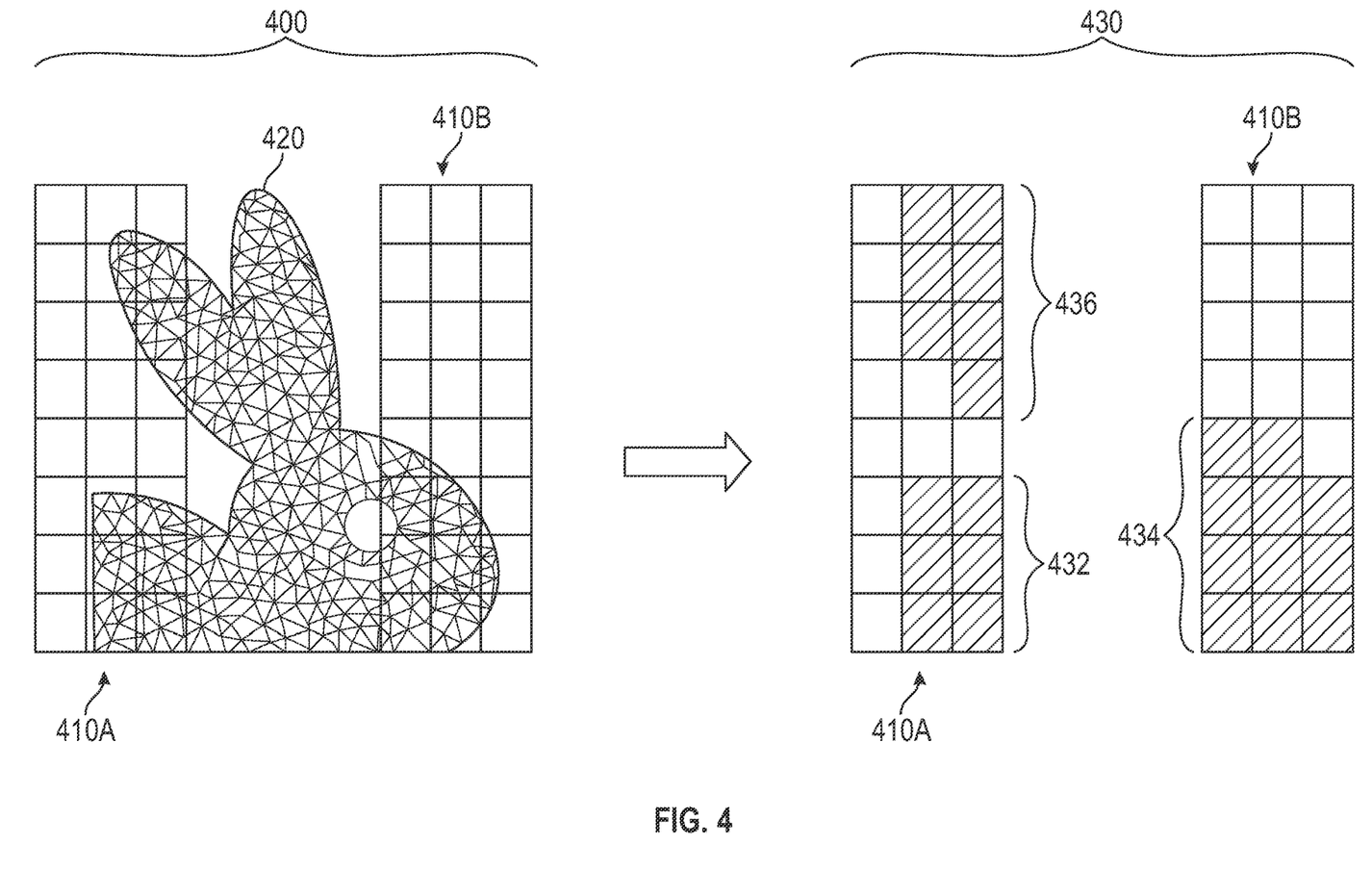
FIG. 4 is an illustration of a general signed distance field calculation technique, indicating interference between a first object and a second object, as known in the art.

The signed distance field collision check will not result in false positive collisions in the area of the gripper finger contact surfaces, because the adjusted grasps include the small clearance margin FIG. 4 is an illustration of a general signed distance field calculation technique, indicating interference between a first object and a second object, as known in the art. In illustration 400 at the left, signed distance field grids 410A and 410B represent left and right gripper fingers in the context of the present discussion. An object 420 represents a part to be grasped by the gripper fingers, where the object 420 is defined with a surface point mesh. The signed distance field grids 410A and 410B and the object 420 are shown in a configuration where the signed distance field grids 410A and 410B are positioned relative to the object 420 according to a particular grasp. FIG. 4 is a 2D illustration for the sake of drawing clarity, but it is to be understood that the surface point mesh of the object 420 and the signed distance field grids 410A and 410B are all three-dimensional in an actual signed distance field collision check computation.

In illustration 430 at the right, the signed distance field grids 410A and 410B are shown without the object 420. The signed distance field grids 410A and 410B have been shaded (with hatch lines) to indicate grid cell occupancy by the object 420. Reference 432 indicates a group of six grid cells (shaded) which are occupied by the object 420. It can readily be seen in the illustration 400 at left that some portion (one or more points of the surface point mesh) of the object 420 falls within the six grid cells indicated at 432. Likewise, reference 434 indicates a group of eleven grid cells (shaded) which are occupied by the object 420 (the nose portion of the bunny), and reference 436 indicates a group of seven grid cells (shaded) which are occupied by the object 420 (one of the ears of the bunny).

In order to determine the occupancy (yes/no) of each grid cell, the distance from each grid cell to the nearest point on the object 420 is calculated. Grid cells with a distance greater than zero are not occupied (not shaded in the illustration 430), and grid cells with a distance less than or equal to zero are occupied (shaded). The simple visual example of FIG. 4 illustrates the concept of signed distance field grid call occupancy, which is used in the box 380 of FIG. 3, and is described in detail below.

Figure 5:
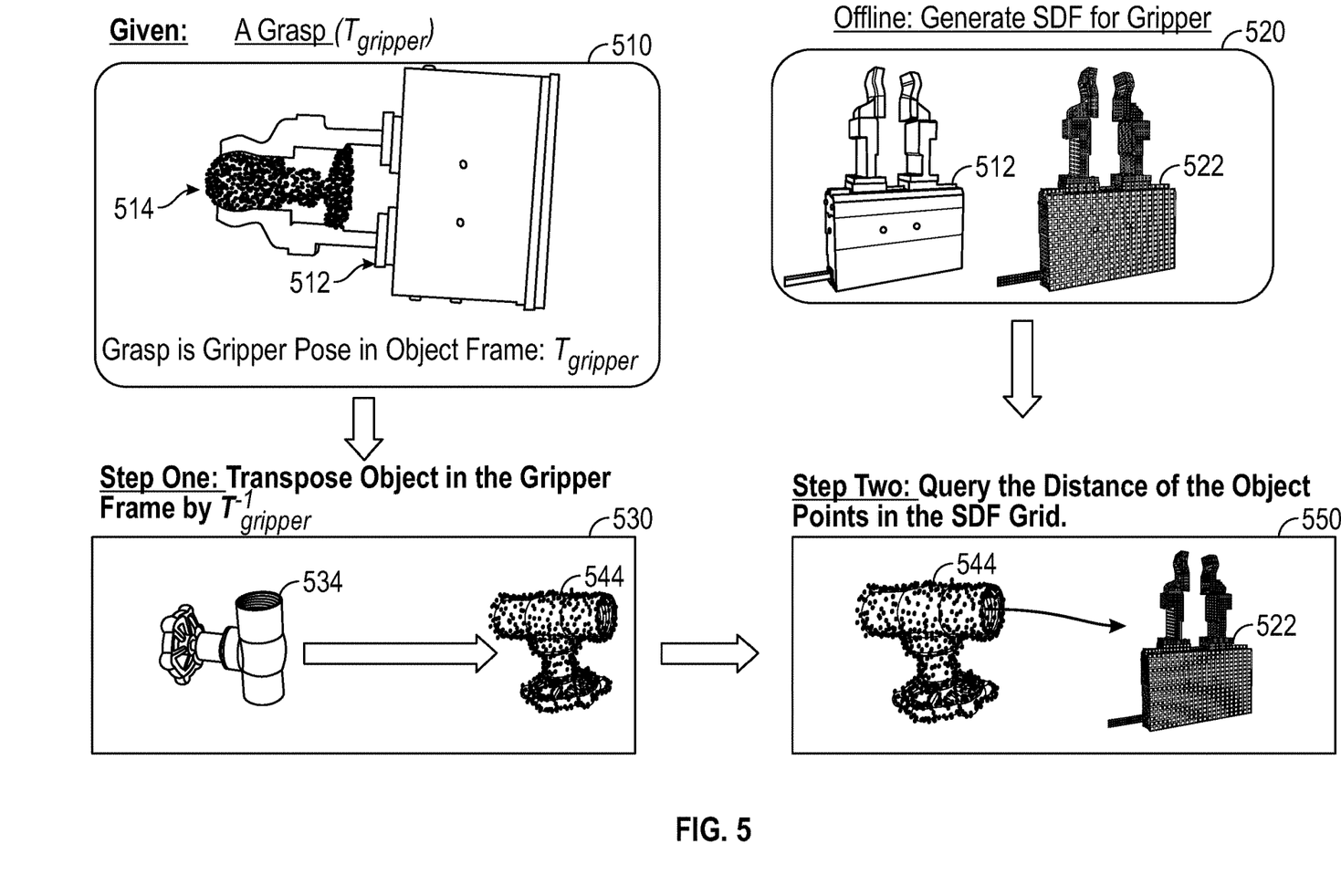
FIG. 5 is an illustration of the details of a signed distance field collision checking technique used in the grasp generation process of FIGS. 2 and 3 to eliminate grasps having a part-gripper interference after grasp adjustment, according to an embodiment of the present disclosure.

FIG. 5 is an illustration of the details of a signed distance field collision checking technique used in the grasp generation process of FIGS. 2 and 3 to eliminate grasps having a part-gripper interference after grasp adjustment, according to an embodiment of the present disclosure. As discussed above, the signed distance field collision check is performed at the box 380 on each of the adjusted grasps from the box 370. This process is described for one particular grasp in the discussion of FIG. 5.

At box 510, one of the adjusted grasps from the box 370 is provided. A gripper 512 is shown in CAD model form, and an object or part 514 is shown in point cloud form. The grasp is defined as the pose of the gripper 512 ($T_{gripper}$) in the coordinate frame of the part 514. At box 520, a signed distance field grid 522 for the gripper 512 is generated. Generating the signed distance field grid 522 is done only once for the entire set of adjusted grasps to be evaluated, in an offline process. In other words, generating the signed distance field grid 522 does not affect the amount of computing time it takes to evaluate all of the adjusted grasps from the box 370. The signed distance field grid 522 is a 3D grid of volume elements such as hexahedra, which may be brick-shaped or cubic. The sizes of the grid elements may vary by location to suit accuracy requirements—such as a grid edge size of 3 mm in the body/actuator portion of the gripper, and a grid edge size of 0.3 mm in the gripper fingers.

At box 530, the first step of the signed distance field collision check for the particular grasp is performed. A part 534 is shown in CAD model form. At the box 530, the part 534 is transposed to the gripper coordinate frame by using the inverse of the grasp $T_{gripper}$. That is, the part 534 is transposed by $T_{gripper}$, resulting in a part 544 (shown again in point cloud form) in the gripper coordinate frame.

At box 550, the second step of the signed distance field collision check for the particular grasp is performed, where the part 544 in the gripper coordinate frame is used along with the signed distance field grid 522 for the gripper 512. The signed distance field grid 522 is defined in terms of a 3D grid space (i,j,k). For each point $544_n$ in the point cloud of the part 544 (which may include several thousand points, particularly on the part's surface), the point's Cartesian coordinates are converted into the grid space (i,j,k). If the point $544_n$ has grid indices (i,j,k) which fall completely outside of the signed distance field grid 522, then the point $544_n$ is far away from the gripper 512, and the process moves on to check the next point $544_m$ in the point cloud of the part 544.

If the point $544_n$ has grid indices (i,j,k) which fall inside the overall boundaries of the signed distance field grid 522, then the point $544_n$ is known to either be near the gripper 512 or to interfere with the gripper 512. In this case, the sign of the distance to the nearest grid (SDF(i,j,k)) is checked, using known 3D distance calculations. If SDF(i,j,k)>0, then the point $544_n$ has no collision with the gripper 512, and the process moves on to check the next point $544_m$. If SDF(i,j,k)<0, then the point $544_n$ has a collision with the gripper 512, which means the part 514 interferes with the gripper 512.

If, for a particular grasp (from the adjusted grasps of the box 370), all of the points in the point cloud of the part 544 have a signed distance field value greater than zero, then that grasp is determined to be collision-free, and the grasp is placed into the final collision-free grasps set in the box 390.

If, for a particular grasp, any of the points in the point cloud of the part 544 have a signed distance field value less than zero, then that grasp is determined to have a part-gripper interference, and the grasp is not placed into the final collision-free grasps set in the box 390. In this case, the minimum distance value (largest penetration) is listed and the corresponding object point is displayed graphically for a user to understand why that particular grasp was discarded due to part-gripper interference.

The process shown on FIG. 5 and described above is carried out for each of the grasps in the adjusted grasps of the box 370, and the final set of grasps in the box 390 includes only those adjusted grasps which are determined to be collision-free. The final set of grasps in the box 390 are then available for use by a robot for a pick-and-place operation as shown in FIG. 1.

The grasp generation technique shown in FIGS. 2, 3 and 5 has been demonstrated on a variety of real-world parts to produce a high quality grasp database—including a wide diversity of grasp locations on the part and grasp approach directions, while eliminating part-gripper interferences. The computed grasp database has also been demonstrated to enable quick and effective grasp identification in a robotic grasping system of the type shown in FIG. 1.

The grasp generation technique discussed above offers several advantages over existing methods. The disclosed methods provide high quality, full-DOF grasps with surface contacts, which are robust to uncertainties and disturbances. The grasp generation method includes grasp optimization which is modeled with gripper contact surfaces only, thus providing much faster computation than full-geometry prior art optimization methods. The disclosed method performs grasp optimization using the virtual gripper surface to provide a clearance margin, resulting in elimination of false alarm collision warnings in subsequent signed distance field calculations. In addition, the signed distance field collision check provides fast and efficient detection of actual part-gripper interference conditions which occur at locations away from the intended gripper contact surface interface with the part.

Throughout the preceding discussion, various computers and controllers are described and implied. It is to be understood that the software applications and modules of these computers and controllers are executed on one or more computing devices having a processor and a memory module. In particular, this includes a processor in the robot controller 150 which controls the robot 100 performing the object grasping, and in the computer 160 which performs the grasp generation computations. As discussed earlier, either the controller 150 or the computer 160 may be configured to identify objects for grasping in real time operations.

While a number of exemplary aspects and embodiments of the collision handling methods in robotic grasp generation have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for generating a collision-free grasp database for use by a robotic grasping system, said method comprising:
   providing an object model including three-dimensional (3D) shape data for an object to be grasped, and a gripper model including 3D shape data and finger kinematics for a gripper;
   providing a database of candidate grasps of the gripper on the object;
   defining a gripper virtual contact surface which is offset from a gripper finger contact surface on each finger of the gripper based on a predefined clearance margin;
   performing a grasp optimization on each of the candidate grasps to produce a database of adjusted grasps, using a computer having a processor and memory, where the grasp optimization maximizes a grasp quality value using the gripper virtual contact surfaces and a point cloud representation of the object model;
   performing a signed distance field collision check on each of the adjusted grasps using the point cloud representation of the object model and a signed distance field grid of the gripper; and
   providing the collision-free grasp database including each of the adjusted grasps which are determined to be collision-free in the signed distance field collision check.

2. The method according to claim 1 wherein the gripper virtual contact surface is offset from the gripper finger contact surface in a direction in which each gripper finger moves when grasping an object.

3. The method according to claim 1 further comprising using the collision-free grasp database during live robotic operations to identify a target object to grasp from a container of objects, including identifying the target object by mapping grasps from the collision-free grasp database onto estimated object poses from camera or sensor data, and providing target object grasp data to a robot controller which instructs a robot fitted with the gripper to grasp and move the target object.

4. The method according to claim 1 wherein each candidate grasp, adjusted grasp and collision-free grasp defines a pose of the gripper in a coordinate frame of the object.

5. The method according to claim 4 wherein the pose of the gripper in the coordinate frame of the object includes three positions and three rotations, and a gripper width.

6. The method according to claim 1 wherein the grasp optimization is formulated by defining sampling points on the gripper virtual contact surfaces and the point cloud representation of the object model, including a nearest neighbor point on the object corresponding with each of the sampling points on the gripper virtual contact surfaces.

7. The method according to claim 1 wherein the grasp optimization includes an objective function which converges to a locally-optimum grasp quality defined based on a total distance between each sampling point on the gripper virtual contact surfaces and its corresponding nearest neighbor point on the object, and includes a constraint equation which penalizes penetration of the gripper virtual contact surfaces into the object.

8. The method according to claim 7 wherein the grasp optimization using the gripper virtual contact surface results in an adjusted grasp in which the gripper finger contact surfaces are spaced from the object by the clearance margin.

9. The method according to claim 1 wherein performing the signed distance field collision check includes transforming the point cloud representation of the object model into a coordinate frame of the signed distance field grid of the gripper using an inverse of a pose defining the adjusted grasp.

10. The method according to claim 9 wherein performing the signed distance field collision check includes determining that the adjusted grasp is collision-free if no point in the point cloud representation of the object model falls within a grid cell of the signed distance field grid of the gripper.

11. The method according to claim 1 wherein the database of candidate grasps includes a large plurality of grasps, each defining a different position and orientation of the gripper with respect to the object, and which have not been evaluated for grasp quality or object-gripper interference.

12. A method for generating a collision-free grasp database, said method comprising:
provided a three-dimensional (3D) model of an object to be grasped, and a 3D model of a gripper;
providing a database of candidate grasps of the gripper on the object;
performing a grasp optimization on each of the candidate grasps to produce a database of adjusted grasps, using a computer having a processor and memory, where the grasp optimization maximizes a grasp quality value using a gripper virtual contact surface which is offset from a gripper finger contact surface on each finger of the gripper and a point cloud representation of the object model; and
performing a signed distance field collision check on each of the adjusted grasps to provide the collision-free grasp database including each of the adjusted grasps which are determined to be collision-free in the signed distance field collision check.

13. A robotic grasp generation system comprising:
a computer having a processor and memory, said computer configured to generate
a collision-free grasp database, including;
providing an object model including three-dimensional (3D) shape data for an object to be grasped, and a gripper model including 3D shape data and finger kinematics for a gripper;
providing a database of candidate grasps of the gripper on the object;
defining a gripper virtual contact surface which is offset from a gripper finger contact surface on each finger of the gripper based on a predefined clearance margin;
performing a grasp optimization on each of the candidate grasps to produce a database of adjusted grasps, where the grasp optimization maximizes a grasp quality value using the gripper virtual contact surfaces and a point cloud representation of the object model;
performing a signed distance field collision check on each of the adjusted grasps using the point cloud representation of the object model and a signed distance field grid of the gripper; and
providing the collision-free grasp database including each of the adjusted grasps which are determined to be collision-free in the signed distance field collision check.

14. The system according to claim 13 further comprising:
a 3D camera providing depth images to the computer of a container of objects during live robotic operations, where the computer identifies a target object to grasp from the container of objects by mapping grasps from the collision-free grasp database onto estimated object poses from the depth images;
a robot controller in communication with the computer and receiving grasp data about the target object; and
a robot fitted with the gripper to grasp and move the target object based on commands from the controller.

15. The system according to claim 13 wherein the gripper virtual contact surface is offset from the gripper finger contact surface in a direction in which each gripper finger moves when grasping an object.

16. The system according to claim 13 wherein each candidate grasp, adjusted grasp and collision-free grasp defines a pose of the gripper in a coordinate frame of the object, including three positions and three rotations, and a gripper width.

17. The system according to claim 13 wherein the grasp optimization is formulated by defining sampling points on the gripper virtual contact surfaces and the point cloud representation of the object model, including a nearest neighbor point on the object corresponding with each of the sampling points on the gripper virtual contact surfaces.

18. The system according to claim 13 wherein the grasp optimization includes an objective function which converges to a locally-optimum grasp quality defined based on a total distance between each sampling point on the gripper virtual contact surfaces and its corresponding nearest neighbor point on the object, and includes a constraint equation which penalizes penetration of the gripper virtual contact surfaces into the object.

19. The system according to claim 17 wherein the grasp optimization using the gripper virtual contact surface results in an adjusted grasp in which the gripper finger contact surfaces are spaced from the object by the clearance margin.

20. The system according to claim 13 wherein performing the signed distance field collision check includes determining that the adjusted grasp is collision-free if no point in the point cloud representation of the object model falls within a grid cell of the signed distance field grid of the gripper.

* * * * *